(12) United States Patent
Maher

(10) Patent No.: US 8,114,272 B2
(45) Date of Patent: Feb. 14, 2012

(54) METHOD FOR TREATING REFINERY WASTE STREAMS IN A FLUID CATALYTIC CRACKING UNIT AND AN IMPROVED CATALYTIC CRACKING UNIT FOR PROCESSING REFINERY WASTE STREAMS

(75) Inventor: Patrick J. Maher, Kingwood, TX (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 504 days.

(21) Appl. No.: 12/232,942

(22) Filed: Sep. 26, 2008

(65) Prior Publication Data

US 2010/0078352 A1    Apr. 1, 2010

(51) Int. Cl.
*C10G 11/00*    (2006.01)

(52) U.S. Cl. ........................................................ 208/113

(58) Field of Classification Search .................... 208/113
See application file for complete search history.

(56) References Cited

U.S. PATENT DOCUMENTS

| | | | |
|---|---|---|---|
| 2,777,428 A * | 1/1957 | Campbell et al. | 422/223 |
| 4,438,082 A * | 3/1984 | Dettling et al. | 423/235 |
| 4,744,962 A | 5/1988 | Johnson et al. | |
| 4,828,680 A * | 5/1989 | Green et al. | 208/120.2 |
| 4,986,897 A * | 1/1991 | Chin | 208/113 |
| 5,240,690 A | 8/1993 | Tang et al. | |
| 5,413,699 A | 5/1995 | Chou | |
| 2007/0140942 A1 | 6/2007 | Rosen et al. | |

OTHER PUBLICATIONS

PCT/US2009/057299, PCT International Search Report, dated Dec. 16, 2009, 4 pgs.
PCT/US2009/057299, PCT Written Opinion of the International Searching Authority, dated Dec. 16, 2009, 6 pgs.

* cited by examiner

*Primary Examiner* — Jill Warden
*Assistant Examiner* — Randy Boyer
(74) *Attorney, Agent, or Firm* — Glenn T. Barrett

(57) ABSTRACT

A method of processing the waste stream includes introducing the waste stream into the Fluid Catalytic Cracking Unit such that waste stream is processed within the regenerator unit or in CO boiler unit such that the waste stream and the regenerator flue gas are burned within the regenerator unit or the CO boiler unit. The waste stream contains $NH_3$ and the $NH_3$ is converted to the NOx and $N_2$. The fluid catalytic cracking unit may further include an assembly for converting NOx to $N_2$. Flue gas from the CO boiler unit containing NOx and $N_2$ is fed to the assembly to NOx to $N_2$ within the assembly. The assembly for converting NOx to $N_2$ preferably includes a selective catalytic reduction unit containing a catalyst, and wherein converting NOx to $N_2$ includes reacting the NOx with the catalyst to produce $N_2$ and $H_2O$.

6 Claims, 2 Drawing Sheets

METHOD FOR TREATING REFINERY WASTE STREAMS IN A FLUID CATALYTIC CRACKING UNIT AND AN IMPROVED CATALYTIC CRACKING UNIT FOR PROCESSING REFINERY WASTE STREAMS

FIELD OF THE INVENTION

This invention relates to a process for treating refinery waste streams. In particular, the present invention relates to a process for treating nitrogen-containing refinery waste streams while minimizing NOx emissions. More particularly, the present invention relates to the use of a fluid catalytic cracking (FCC) unit to process the nitrogen-containing refinery waste stream. This invention also relates to an improved FFC unit capable of processing nitrogen-containing refinery waste streams.

BACKGROUND OF THE INVENTION

Purified water and processed steam are used in many oil refinery operations. Purified water is often used in heat exchangers and various water-wash operations. Processed steam is used in pipestills, cokers, fluid catalytic cracking units, mid-distillate strippers, light distillate strippers and other applications. As a result of this use, significant quantities of contaminated sour refinery water are produced. The sour water may contain suspended and dissolved impurities, such as phenols, sulfides, ammonia, and other hydrocarbons. The processing of the sour water can generate a waste stream that is highly concentrated in ammonia, which must be disposed of in an environmentally safe manner. The sour water is typically stripped with steam to remove the impurities. In a two-stage stripping process, the sulfides are substantially stripped out in the first stage for processing in a sulfur plant. In the second stages a waste stream consisting substantially of ammonia and steam is produced. The waste stream containing ammonia may be burned, but an undesirable by-product of this incineration is the generation of oxides of nitrogen (NOx) (i.e., NOx emissions). NOx emissions are highly regulated by regulatory agencies.

One approach for treating waste streams containing high concentrations of nitrogen, while minimizing NOx emissions, is offered by the John Zink Company. The John Zink Company's NOxidizer™ system uses a three stage incineration process to limit NOx formation. In the first stage, the waste stream and fuel are burned with less than the stoichiometric requirement of oxygen. The products of the combustion are cooled in the second stage and reoxided in the third stage. The three stages are carried out in a series of refractory-lined vessels along with a high-intensity burner. While the process is effective in disposing of nitrogen-containing waste streams and reducing NOx emissions, the process requires a significant investment of capital along with significant yearly operating costs.

There is a need for a lower cost alternative for processing a nitrogen-containing waste stream while minimizing NOx emissions.

SUMMARY OF THE INVENTION

It is an aspect of the present invention to provide a method of processing a waste stream in a fluid catalytic cracking unit. The method includes introducing the waste stream into a portion of the fluid catalytic cracking unit and processing the waste stream within the fluid catalytic cracking unit.

In accordance with an aspect of the present invention, the fluid catalytic cracking unit includes a reactor unit for reacting a process stream with a catalyst contained therein, a regenerator unit for regenerating the catalyst, and a CO boiler unit for processing regenerator flue gas. The method of processing the waste stream includes introducing the waste stream into the CO boiler unit such that the waste stream and the regenerator flue gas are burned within the CO boiler unit. The waste stream contains $NH_3$ and the $NH_3$ is converted to NOx and $N_2$ in the CO boiler unit. The fluid catalytic cracking unit may further include an assembly for converting NOx to $N_2$. Flue gas from the CO boiler unit containing NOx is fed to the assembly to convert NOx to $N_2$ within the assembly. The assembly for converting NOx to $N_2$ preferably includes a selective catalytic reduction unit containing a catalyst, and wherein converting NOx to $N_2$ includes reacting the NOx with injected NH3 and using the catalyst to produce $N_2$ and $H_2O$.

In accordance with another aspect of the present invention, the fluid catalytic cracking unit includes a reactor unit for reacting a process stream with a catalyst contained within the reactor unit. The fluid catalytic cracking unit also includes a regenerator unit for regenerating the catalyst and a CO boiler. The method of processing the waste stream includes introducing the waste stream into the regenerator unit. The waste stream contains $NH_3$. The waste stream is processed within the regenerator unit to convert a significant portion of the $NH_3$ to $N_2$. The waste stream containing $NH_3$ is burned within the regenerator unit as the catalyst is regenerated. The regenerator unit is operated at a sufficient temperature such that the $NH_3$ is converted to NOx and subsequently a significant portion is converted to $N_2$.

BRIEF DESCRIPTION OF THE DRAWINGS

The invention will now be described in conjunction with the accompanying drawings in which like reference numerals describe like elements and wherein.

DETAILED DESCRIPTION OF PREFERRED EMBODIMENTS

The present invention will now be described in greater detail in connection with the attached figure. A fluid catalytic cracking (FCC) unit is a primary conversion unit in most integrated refineries to convert heavier oils (e.g., heavy gas oil, vacuum gas oil or coker gas oil) into lighter products (e.g., gasoline, naphtha and lighter gases). The FCC process works in the presence of a zeolitic catalyst with a riser or fluid bed reactor and a regenerator system. The reactor unit and the regenerator unit form the basis of the conventional FCC unit.

Figure 1:
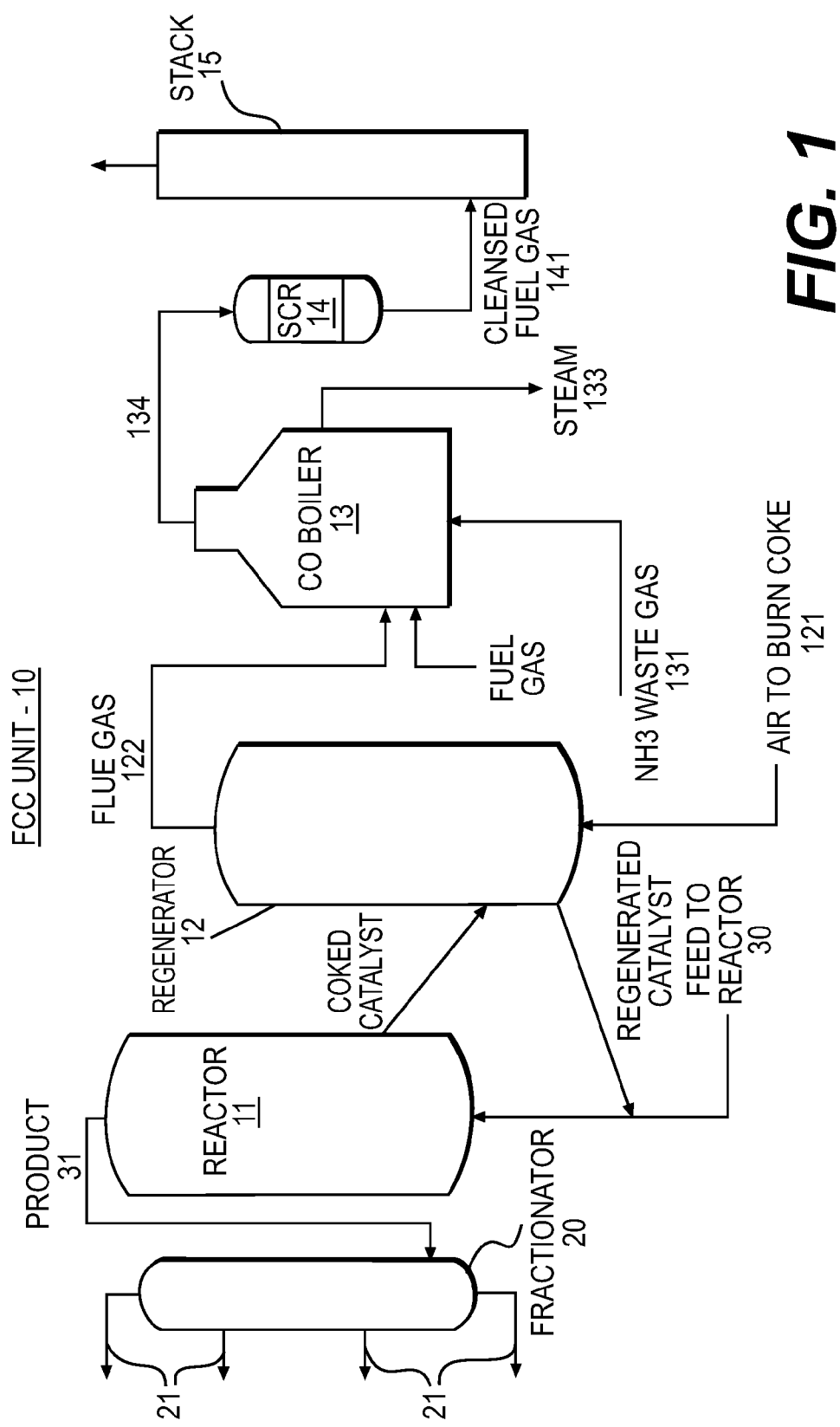
FIG. 1 is a schematic diagram of a fluid catalytic cracking unit for processing $NH_3$ waste gases in accordance with an embodiment of the present invention.
Figure 2:
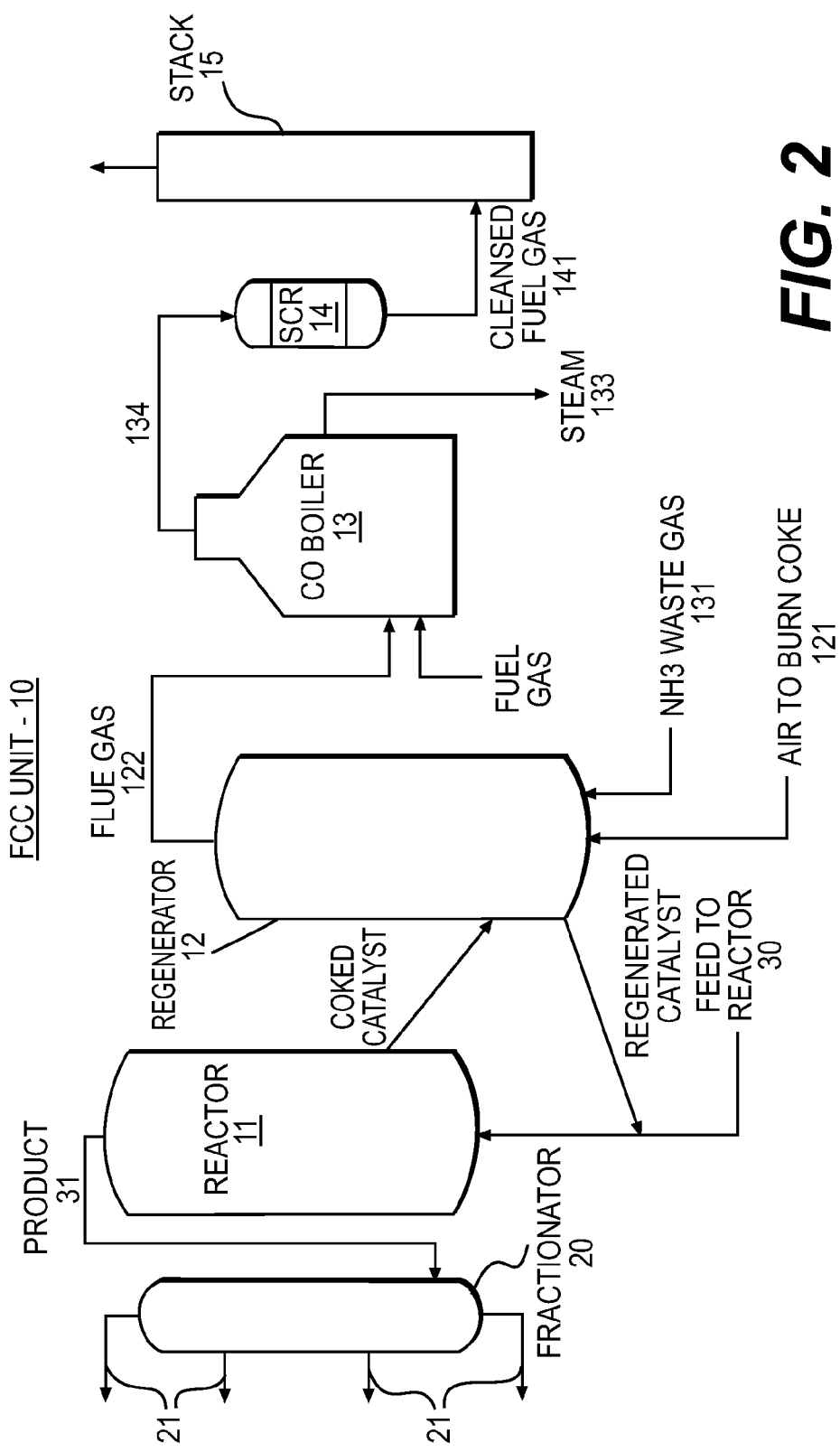
FIG. 2 is a schematic diagram of fluid catalytic cracking unit for processing $NH_3$ waste gases in accordance with an another embodiment of the present invention

FIG. 1 illustrates a fluid catalytic cracking unit 10 in accordance with an aspect of the present invention. The FCC unit 10 includes a reactor unit 11 containing the zeolitic catalyst. The heavier oil feed or process stream 30 is fed into the reactor unit 11 where it is vaporized and cracked into smaller molecules of vapor by contact and mixing with the catalyst within the reactor unit 11. The vaporized process stream 31 is fed to a distillation column 20 to undergo fractionation where the process stream is separated into various lighter end products 21. The reaction within the reactor unit 11 produces a carbonaceous material or coke that deposits on the catalyst which reduces the catalyst activity. In order to maintain the effectiveness of the catalyst, the catalyst must be regenerated to burn off the deposited coke. The coked catalyst is fed to a regenerator unit 12 to burn off the coke. Air is fed into the regenerator unit 12 through a regenerator air line 121 to facilitate the regeneration process. The regenerated heated catalyst is then fed back to the reactor unit 11 for reaction with the process stream.

The regeneration of the catalyst in the regenerator unit 12 produces a flue gas 122 typically containing carbon dioxide ($CO_2$) and carbon monoxide (CO) gas. The amount of CO produced in the regeneration process is dependent upon the design of the unit 12, the temperature upon which regeneration occurs and the amount of excess oxygen (e.g., higher regeneration temperatures and higher excess oxygen produce lower quantities of CO). The flue gas from the regenerator unit 12 may be fed to a CO boiler unit 13 where the regenerator flue gas is typically burned with a fuel gas 131 to produce steam 133 for use in the refinery. As a result, the CO is burned, which limits CO emissions. The flue gas may then be subject to further processing to reduce contaminants before release into the environment through stack 15.

The combination of a reactor unit 11, a regenerator unit 12 and a CO boiler 13, if necessary, are considered to be conventional components in FCC units and whose operation and construction are well known in the fluid catalytic cracking art. Aspects of the present invention will now be described in greater detail in particular the use of the FCC unit to process $NH_3$ waste streams. The nitrogen-containing waste stream is introduced into the FCC unit at a predetermined located so that the NOx formed when the waste stream is burned can be reduced to molecular nitrogen before its release to the atmosphere. The predetermined location is dependent upon the design of the FCC unit, the unit operating temperatures and the provision of certain NOx reducing equipment.

In accordance with one embodiment of the present invention, a waste stream 132 containing $NH_3$ is fed into the CO boiler unit 13, where it combines with the regenerator flue gas 122 and a fuel gas 131. In the CO boiler unit 13, the waste stream 131, the fuel gas 132 and the flue gas 122 are burned to produce steam 133, which may be used in other refinery applications. The $NH_3$ in the waste stream is converted to NOx and $N_2$ in the CO boiler unit 13. The flue gas 134 from the CO boiler unit 13 contains $CO_2$ and $N_2$ and certain amounts of NOx. The processing of the waste stream in the boiler unit 13 increases the NOx emissions from the CO boiler unit 13 from about 60-80 ppm up to about 200-300 ppm. The level of NOx contained in the flue gas 134 will require additional processing before the flue gas 134 can be released to the environment through the stack 15.

The flue gas 134 may undergo subsequent processing to reduce NOx prior to release to the atmosphere. In accordance with an aspect of the present invention, the flue gas is further processed using a selective catalytic reduction (SCR) unit 14, where the flue gas is exposed to a catalyst such that an acceptable amount of NOx is converted to $N_2$ and $H_2O$. The use of the SCR unit 14 after the CO boiler unit 13 will likely bring the NOx emissions down to less than 40 ppm. The cleansed flue gas 141 may then be released through stack 15. This combination is a low cost alternative for the processing of $NH_3$. The subsequent processing of the flue gas is not limited to the use of an SCR unit; rather, it is contemplated that the flue gas may be processed by selective non-catalytic reduction (e.g., a process marketed by ExxonMobil as the Thermal DeNOx process), wet gas scrubbing plus (WGS+) and oxidation of the flue gas with ozone followed by wet scrubbing.

In accordance with another aspect of the present invention, the nitrogen-containing waste stream can be processed by introducing the waste stream 123 with air from the regenerator air line 121 such that the waste stream 123 is introduced into the regenerator unit 12. The nitrogen in the waste stream will initially burn to NOx in the regenerator unit 12. As NOx passes through the regenerator unit 12, NOx will be substantially converted to $N_2$ as it passes through the catalyst bed within the unit 12 and reacts with coke on catalyst. The coke on the catalyst reacts with the NOx to form molecular nitrogen. Depending on the design and operation of the regenerator, it may be possible to process the waste stream to remove $NH_3$ while maintaining acceptable NOx levels (e.g., on the order of 20-40 ppm) without the need for further processing or the need for any additional add-on NOx control devices. In the event that the NOx reduction is not at acceptable levels, it may be necessary to combine the present arrangement with an additional NOx control device (e.g., SCR unit, wet gas scrubbing plus, SNCR, etc.) in order to further reduce the presence of NOx to appropriate levels.

It will be apparent to those skilled in the art that various modifications and/or variations may be made without departing from the scope of the present invention. Thus, it is intended that the present invention covers the modifications and variations of the apparatus and methods herein, provided they come within the scope of the appended claims and their equivalents.

What is claimed is:

1. A method of processing a waste stream in a fluid catalytic cracking unit, comprising:
   introducing the waste stream into the fluid catalytic cracking unit; and
   processing the waste stream within the fluid catalytic cracking unit,
   wherein the fluid catalytic cracking unit includes a reactor unit for reacting a process stream with a catalyst contained therein, a regenerator unit for regenerating the catalyst, and a CO boiler unit for processing regenerator flue gas, wherein introducing the waste stream into the fluid catalytic cracking unit comprising introducing the waste stream into the CO boiler,
   wherein processing the waste stream within the fluid catalytic cracking unit includes burning the waste stream within the CO boiler unit,
   wherein the waste stream contains $NH_3$, and
   wherein processing the waste stream includes converting the $NH_3$ to NOx and $N_2$ in the CO boiler unit.

2. The method according to claim 1, wherein the fluid catalytic cracking unit further includes an assembly for converting NOx to $N_2$, and wherein processing the waste stream further includes converting NOx to $N_2$ within the assembly.

3. The method according to claim 2, wherein the assembly for converting NOx to $N_2$ includes a selective catalytic reduction unit containing a catalyst, and wherein converting NOx to $N_2$ includes reacting the NOx with NH3 over the catalyst to produce $N_2$ and $H_2O$.

4. A method of processing a waste stream in a fluid catalytic cracking unit, comprising:
   introducing the waste stream into the fluid catalytic cracking unit; and
   processing the waste stream within the fluid catalytic cracking unit,
   wherein the waste stream contains $NH_3$,
   wherein processing the waste stream includes converting the $NH_3$ to NOx and $N_2$, wherein the fluid catalytic cracking unit includes a regenerator unit for regenerating catalyst and a CO boiler unit operatively connected to the regenerator unit,
wherein the CO boiler unit processing regenerator flue gas from the regenerator unit, wherein processing the waste stream comprising:
- feeding the waste stream to the CO boiler unit; and
- burning the waste stream in the CO boiler unit to convert the $NH_3$ to NOx and $N_2$.

5. The method according to claim 4, wherein the fluid catalytic cracking unit further includes an assembly for converting NOx to $N_2$, and wherein processing the waste stream further comprising:
- feeding a flue gas from the CO boiler unit containing NOx to the assembly; and converting NOx to $N_2$.

6. The method according to claim 5, wherein the assembly for converting NOx to $N_2$ includes a selective catalytic reduction unit containing a catalyst, and wherein converting NOx to $N_2$ includes reacting the NOx with NH3 over the catalyst to produce $N_2$ and $H_2O$.

* * * * *